United States Patent Office 2,697,082
Patented Dec. 14, 1954

2,697,082

USE OF CORK AS A FLOW MODIFIER IN THERMO-SETTING PHENOL - FORMALDEHYDE MOLD-ING COMPOUNDS CONTAINING THE BAST FIBER OF BARK

Clark C. Heritage, Tacoma, Wash., assignor to Weyerhaeuser Timber Company, Tacoma, Wash., a corporation of Washington No Drawing. Application October 24, 1952,
Serial No. 316,808

2 Claims. (Cl. 260—17.2)

This invention relates generally to the manufacture of thermally stable plastic materials made from compounds comprising substantial quantities of comminuted components of the barks of trees, and has particular reference to the incorporation of thermoplastic substances in the formulation in order to modify and control the flow properties of the thermosetting molding compositions.

It is a definitive characteristic of a thermosetting molding compound that as heat and pressure are applied in the molding step the thermosetting component first fuses and then as a result of temperature-accelerated polymerization the product becomes progressively more infusible. It is a very important requirement of a thermosetting molding compound that the material shall remain fusible under molding conditions for sufficient time to permit the complete filling of the mold. The rate at which the infusible state is reached depends upon a number of factors, among which may be listed: (a) the chemical composition of the thermosetting component; (b) the initial level of polymerization of this component; (c) the amount and alkalinity of catalysts present; (d) the temperature of the mold surfaces; (e) the size and shape of the mold cavity; (f) the rate of heat transfer into the piece being molded; and of particular importance to the invention, (g) the relative amount of thermosetting component in the composition undergoing molding.

It is an important characteristic of thermosetting molding compounds comprising comminuted fractions of the barks of trees that strong, attractive and otherwise satisfactory molded products are obtained with the use of substantially less thermosetting resin than is possible when wood flour, walnut shell flour, or other more conventional fillers are employed. Since the resin is the most expensive component of the molding compound, reduction of resin content represents an important economical saving in the manufacture of such compounds.

The reduction of resin content, other factors remaining constant, decreases the duration of the fused or flowable state of the compound in the mold. Thus, it is found that compounds capable of providing strong and attractive simple molded articles may be difficult to mold into complete, complex, contoured pieces, due to the fact that the material under compression does not remain in the fused state for a sufficient length of time to be forced completely into all of the portions of the mold particularly if resin solids content is below 35%. This difficulty may be overcome by an increase in the amount of thermosetting resin. However, this expedient is costly and obviates the advantages characteristic of bark filled compounds, namely, the potential production of high quality material with low resin usage.

I have discovered that by the incorporation of relatively small amounts of thermoplastic resinous materials in bark filled molding compounds the flow properties may be so enhanced that low thermosetting resin containing molding compounds may be used for the molding of complex pieces without sacrificing any of the properties of flow, cure, bulk density, moldability, ease of handling and the like of the molding compound, or of tensile, impact, transverse and other strength properties of the molded piece, its appearance, specific gravity, water absorption and the like.

The instant invention has for its principal object the provision of a thermoplastic resinous material for modifying the flow properties of thermosetting molding compounds which comprise fillers derived from the barks of trees without deleterious effects on the thermoset properties of the molded piece.

It is a further object of the invention to provide for the incorporation of thermoplastic resins in thermosetting molding compounds which comprise fillers derived from the barks of trees for modifying the flow properties of the compound without deleterious effects on the thermoset properties of the molded piece.

It is a further object of this invention to provide for the incorporation of coumarone-indene resins for modifying the flow properties of thermosetting molding compounds which comprise fillers derived from the barks of trees without deleterious effects on the thermoset properties of the molded piece.

It is a further and important object of the invention to provide for the incorporation in thermosetting molding compounds of small quantities of cork derived from the bark of trees as an agent for modifying the flow of said compounds without deleterious effects in the thermoset properties of the molded piece.

Various and other ancillary objects of the present invention will become apparent from the following description and explanation.

A molding compound conventionally comprises a thermosetting resin, an inert filler, a catalyst for the resin, a dye and modifying agents to control mold sticking and staining. Resins which are commonly used include the phenol formaldehyde, phenol furfuraldehyde, the cresol formaldehyde, the resorcinol formaldenyde and urea formaldehyde resins and others. The preferred resin for use in the present invention is a one step, alkali-stabilized phenolformaldehyde liquid resin in which the molar ratio of aldehyde to phenol is greater than 1.1 to 1, and preferably is greater than 1.4 to 1.

The bark of trees represents a large economical and attractive source of easily comminuted material for use as fillers in the manufacture of molding compounds. Bark is composed essentially of three components, namely, cork, sclerenchyma tissue consisting either of fiber or stone cells, and parenchyma tissue which, in finely comminuted state, often is referred to as bark powder. It has been discovered that these separate tissue components of bark have different physical and chemical characteristics which distinguish each of them from the others, and that each of said components contributes properties to a molding compound differing in accordance with the physical and chemical constituents of the component.

Cork is that component of bark which, when highly comminuted, will float on a benzene-carbon tetrachloride mixture having a density of 1.24 g./cc. Sclerenchyma is that component of bark which, when highly comminuted to completely separate it from other components of the bark, will in the case of Douglas fir sink in a benzene-carbon tetrachloride mixture having a density of 1.45 g./cc. but will float on such a mixture having a density of 1.47 g./cc. The parenchyma tissue may be considered to be the remaining portion of the bark after removal of the cork and fiber.

Any one or a carefully blended combination of bark components may be selected as an ingredient of molding compounds having predetermined and reproducible properties. Whole bark, however, is completely unsuited for use as a satisfactory filler because of the variation of properties which the several components of the bark impart to the compound. For example because of their thermoplasticity, bark fractions which are rich in cork, or which are rich in parenchyma tissue or powder, are unsuited for use as thermosetting molding compound fillers. Control of the limits of contamination of one bark fraction with others is of great importance in the control of the properties of thermosetting molding compounds comprising bark components.

Of the three components of bark, namely, cork, fiber and powder, the fiber is the most desirable for use as a filler in a molding compound, for the reason that it imparts excellent strength and impact resistance to the molded piece, but more particularly because it has a low specific surface and is difficult to impregnate with resin.

The molding compounds embodying the invention require less than the conventional content of resin solids, presumably due to the fact that the structure of the sclerenchyma is such as to render it essentially impervious to resin impregnation, and the resin remains on the surface of the filler particles and functions as a bonding agent and to promote flow, rather than being absorbed by the filler.

Molding compounds embodying the invention may comprise either one-step or two-step thermosetting resins, and these may either be liquid or solid. A significant advantage of the instant invention lies in the use of relatively low percentages of resin solids. It is conventional in the art relating to thermosetting molding compound manufacture to use a minimum of 40% resin solids, and frequently resin usages are of the order of 50% to 70% of the composition. The invention teaches that with the use of fillers derived from bark, acceptable molding compounds are produced with as little as 15% to 40% resin solids, based on the solids content of the composition, and that general purpose competitive molding compounds are made in which the resin solids content is between 25% and 35%. The ability to use such relatively low resin content, however, is due to the unique properties of the filler employed.

Regardless of the type of resin, however, it is required that the resin be produced by use of a greater than normal stoichiometric proportion of aldehyde in order to provide sufficient active methylene groups to supply the requirements of the aldehyde-reactable material in the resin such as phenol, resorcinol, cresol or urea, and also the requirements of the aldehyde-reactive constituents of the filler. This is probably explained by the fact that bark components contain phenol-like substances which are aldehyde-reactive. For example, if the aldehyde to phenol ratio in a phenolic resin employed is such that the aldehyde content is sufficient only to cause a minimum of cross linking in the set-up polymer, and if reactive bodies in the filler react with a portion of this aldehyde, then there will be insufficient aldehyde present to completely thermoset the resin. The result is a molding compound which is more nearly thermoplastic than thermosetting. In other words, there must be sufficient aldehyde present in the resin both to react with the reactive bodies of the filler and to provide methylenic cross linkages for the resin. It is for this reason that the use of low percentages of resin solids makes certain specified ingredients of the molding compound critical. To illustrate in a comparative manner, the use of high percentages of resin solids cause the thermoplasticity of the compound to persist over sufficiently long periods of time to permit the molding of complex contoured or deep drawn objects before the compound reaches the infusible state. Also, the actual chemical composition of the resin is of lesser importance when the resin is a major constituent of the molding compound. Where, however, the resin solids content of the molding compound is exceptionally low, as in molding compounds embodying the instant invention, complete cross linking of the polymer must be achieved by very careful formulation. Applicant has discovered that fillers derived from bark have a tendency to react with aldehyde to form complex chemical substances. For this reason, the mechanism whereby mixtures of aldehyde-reactable-material and aldehydes react to form insoluble and infusible thermoset masses depends upon the presence of a molar ratio of aldehyde to the aldehyde-reactable-content of the resin which is greater than unity in order to provide sufficient methylenic radicals for the cross linking of the polymer into a three dimensional matrix. If the aforementioned ratio is less than unity, the phenol-aldehyde polymer, for example, will not become three dimensional, and consequently remains perpetually as a thermoplastic material. Because of the aldehyde reactivity of the bark filler, a resin which of itself contains only sufficient aldehyde to become thermoset will remain thermoplastic, or become only partially thermoset, for the reason that a part of the aldehyde is used to satisfy the requirements of the bark filler.

The instant invention embodies the discovery that desirable molding compounds may be made with a liquid one-step phenol-formaldehyde resin in which the ratio of aldehyde to phenol is greater than 1.1:1. The cost factor of a molding compound embodying the invention is two-fold: The liquid one-step resin is less expensive than one-step or two-step solid resins conventionally used in the manufacture of molding compounds, and, when employed in molding compound formulations embodying fillers derived from bark, the resin usage is reduced from customary usages of 50% to 70% of the formulation to from 15% to 35% of the formulation. Notwithstanding the very considerable reduction in resin usage, molding compounds embodying the invention are capable of producing molded pieces having properties equal to or superior to those molded from compounds containing the solid resins.

Preferred flow modifiers for use in low resin content bark filled thermosetting molding compounds which do not deleteriously affect the thermoset properties of the molded articles are the group of hydrocarbon resins including the higher molecular weight terpenes and particularly the coumarone-indene resins and modified coumarone-indene resins. Examples of flow modifiers which have been used successfully are listed herewith together with their trade names, types and properties.

The Velsicol AB–11 series resins are thermoplastic, non-oxidizing hydrocarbon resins which are closely related to coumarone-indene resins.

AB–11–2, AB–11–4 differ only in color, the 11–4 being the darker.

Specific gravity _____ 1.07–1.09
Softening point (ball and ring) _____°F__ 230–245
Iodine number (Wijs) _____max__ 120
Acid number _____ 0–2
Saponification number _____ 0–2

The Velsicol AD–6 series are oxidizing type resins of petroleum origin. Specification of AD–6–7:

Specific gravity _____ 1.09–1.11
Softening point (ball and ring) _____°F__ 200–225
Iodine number (Wijs) _____min__ 180
Acid number _____ 0
Saponification number _____max__ 2

Velsicol AF–3 is a highly unsaturated petroleum resin.

Specific gravity _____ 1.02–1.07
Softening point (ball and ring) _____°F. min__ 150
Iodine number _____min__ 300
Acid number _____ 5.—
Saponification number _____ 0

Nuba 3X is described as a modified coumarone-indene resin.

Melting point _____°C__ 125–150
Insoluble in petroleum benzene_____per cent__ 45
Insoluble in benzene _____do____ 18

Coumarone-indene resins are formed under appropriate catalytic influence by polymerization of the coal tar fractions of coumarone and indene, respectively. Differences in properties depend upon differences in level of polymerization and amounts of impurities.

The following table shows typical formulations and properties of molding compounds made with a liquid one-step phenol-formaldehyde resin containing 3% Velsicol AF–3 for modifying the flow properties of the compound; a two-step solid phenol-formaldehyde resin which did not contain a flow promoting material; a two-step solid phenol-formaldehyde resin containing 1.5% flow modifier and a two-step solid phenol-furfural resin containing 3% flow modifier. The table also shows processing conditions for each compound, and the properties of the several molded articles.

The properties of compounds made with bark fiber or bast fiber and from 20–35% resin are equivalent to properties of molding compounds conventionally made with wood flour or walnut shell flour and from 40–50% resin. As the resin content of molding compounds is reduced from 50% to 30%, and bark fiber usage is correspondingly increased, only slight changes occur in molding compound properties. As the resin usage is decreased below from 25 to 30% the resinous properties of the molding compound gradually diminish and the fibrous properties are gradually accentuated, i. e., flow decreases and becomes stiffer, staining becomes more evident, finish becomes duller, the surface slightly rougher, and water absorpotion increases. Strength is relatively unaffected except for impact which generally increases. However, even at 20% resin usage, these defects are not objectionable and are overcome by proper formulation. Flow

TABLE I

|  | Liquid 1-step Ph.-for. | Standard 2-step Ph.-for. | Long cure 2-step Ph.-for. | 2-step Ph.-fur. | | |
|---|---|---|---|---|---|---|
| Formulation (Percent O. D. Basis): | | | | | | |
| Resin (type) | 28 | 22 | 28 | 30 | 25 | 30 |
| Bark fiber, 90% pure | 63.5 | 74.5 | 70.5 | 62.5 | 71.0 | 64.5 |
| Lime | | 3.0 | 1.0 | 1.0 | 1.0 | 1.0 |
| MgO | 4.0 | | | | | |
| Zinc Stearate | | | | 0.5 | 0.5 | 0.5 |
| Flow Promoter | 3.0 | | | 5.0 | 1.5 | 3.0 |
| Nubian Resin Black | 1.0 | | | 1.0 | 1.0 | 1.0 |
| Calcium Stearate | 0.5 | 0.5 | 0.5 | | | |
| Processing: | | | | | | |
| Roll Temp., °F.— | | | | | | |
| fast roll | 175 | 225 | 225 | 200 | 200 | 200 |
| slow roll | 225 | 220 | 220 | 250 | 250 | 250 |
| Roll Time (sec.) | 60 | 15 | 10 | 60 | 30 | 60 |
| Properties of Compound: | | | | | | |
| Flow— | | | | | | |
| ASTM Cup/2,000 p. s. i. g. | 22 | 31 | 23 | 14 | 28 | 17 |
| ASTM Cup/500 p. s. i. g. | | | | 52 | | 55 |
| Cure (Sec., ASTM Cup) | 105 | <180 | <180 | 90 | 120 | 180 |
| Bulk Density (gms./100 cc.) | 51.2 | | 47.2 | 53.1 | 47.6 | 58.8 |
| Stain | 2 | 3 | 2 | 2 | 2 | 2 |
| pH | | 9.9 | 8.2 | 8.7 | 9.1 | 9.0 |
| Moisture Content | | 2.2 | 2.1 | 3.2 | 4.8 | 1.9 |
| Properties of Molded Piece: | | | | | | |
| Transverse Strength (p. s. i.) | 10,500 | 10,500 | 11,100 | 10,000 | 10,500 | 10,000 |
| Tensile (p. s. i.) | 7,400 | 7,500 | 7,800 | 7,100 | 7,500 | 6,600 |
| Impact (ft. lbs./in. of notch) | 0.32 | 0.49 | 0.36 | 0.29 | 0.33 | 0.28 |
| Torque (in. lbs.) | 90 | | | 64 | 78 | 32 |
| Moisture absorption, total | 1.20 | 1.71 | 1.21 | 0.95 | 2.05 | 1.32 |

TABLE II

| | | | | | | |
|---|---|---|---|---|---|---|
| Formulation (Percent O. D. Basis): | | | | | | |
| Resin 1-step liquid phenolic | 30 | 28 | 26 | 24 | 22 | 20 |
| Bark product, 90% fiber | 60.5 | 62.5 | 64.5 | 66.5 | 68.5 | 70.5 |
| Lime (hydrated) | 3.0 | 3.0 | 3.0 | 3.0 | 3.0 | 3.0 |
| MgO | 2.0 | 2.0 | 2.0 | 2.0 | 2.0 | 2.0 |
| Flow Promoter (Velsicol AF-3) | 3.0 | 3.0 | 3.0 | 3.0 | 3.0 | 3.0 |
| Nubian Resin Black | 1.0 | 1.0 | 1.0 | 1.0 | 1.0 | 1.0 |
| Calcium Stearate | 0.5 | 0.5 | 0.5 | 0.5 | 0.5 | 0.5 |
| Processing: | | | | | | |
| Roll Temp., °F.— | | | | | | |
| fast roll | 175 | 175 | 175 | 175 | 175 | 175 |
| slow roll | 225 | 225 | 225 | 225 | 225 | 225 |
| Roll Time (sec.) | 120 | 120 | 120 | 120 | 120 | 120 |
| Properties of Compound: | | | | | | |
| Flow (ASTM Cup/2,000 p. s. i. g.) | 11 | 12 | 12 | 25 | 16 | 17 |
| Cure (Sec., ASTM Cup) | 90 | 75 | 75 | 75 | 75 | 75 |
| Cure (Hot Distortion, mils) | 71 | 50 | 57 | 29 | 24 | 33 |
| Bulk Density (gms./100 cc.) | 54.4 | 53.9 | 53.7 | 53.9 | 51.8 | 51.2 |
| Stain | 2.5 | 2.5 | 2.5 | 2.0 | 2.5 | 2.5 |
| pH | 8.7 | 8.7 | 8.7 | 8.9 | 8.9 | 9.0 |
| Moisture Content | 5.3 | 4.4 | | 3.9 | 4.6 | 4.4 |
| Properties of Molded Piece: | | | | | | |
| Transverse Strength (p. s. i.) | 12,300 | 12,200 | 11,500 | 11,100 | 11,300 | 11,000 |
| Impact (ft. lbs./in. of notch) | 0.35 | 0.34 | 0.33 | 0.33 | 0.35 | 0.32 |
| Torque (in. lbs.) (Baronet Cap) | 63 | 66 | 66 | 61 | 59 | 56 |
| Moisture absorption, total | 1.09 | 1.04 | 1.15 | 0.95 | 1.04 | 1.07 | can be improved by the use of cork or other flow promoters. Appearance can be improved by the use of parenchyma tissue, and staining can be reduced by the use of stain suppressors such as magnesium oxide.

Table II shows formulations of molding compounds made with a one-step liquid phenol-formaldehyde resin having an aldehyde to phenol ratio of 1.62:1, and showing usages of from 20% to 30% resin and from 60.5% to 70.5% bark fiber. Each formulation includes 3% Velsicol AF-3 for promoting the flow of the molding compound.

The first requirement of any molding compound is that it has sufficient flow, i. e., that the molding compound has the ability to become plastic under conditions of molding and to remain so until mold is filled. Basically, flow may be defined as a plastic deformability of a molding compound varying with temperature and time in such a way that it decreases with time, and exists only during a definite time interval—the curing time—at the end of which all flow ceases.

Two sets of data have been found useful to express flow, one describing the ability of a given molding compound to fill a mold under conditions of compression molding, the other simulating the essential requirement of transfer molding, i. e., to flow through an orifice. The former may be termed a measure of plasticity, the latter a measure of viscosity.

The test for plasticity is essentially the standard ASTM cup closing test carried out at a temperature of 320° F. on a wide range of pressures for a particular compound. It is sufficient to state the cup closing time at one or two pressures which usually are 4,000 and 1,500 pounds per square inch, respectively.

The test for viscosity is the measurement of duration and amount of material flowing through an orifice when the molding compound is subjected to standard conditions of temperature and pressure.

In differing types of molding operations, various degrees of flow of the molding compound are desired, ranging from fast (i. e., low viscosity) to extremely slow, i. e., high viscosity as, for example, in deep draw molding compounds. Such flow requirements may be met by choice of the proper resin, by advancement of the resin, or by the addition to the molding compound of a flow promoter. Several such flow promoters, essentially thermoplastic resinous materials, have been found to be satisfactory for extending the range of flow of the molding compound during molding operations. The amounts required are relatively small, in the order of magnitude of 1–4%. The promoter does not interfere with the rate of cure and produces a more uniform flow of the material during the rolling step.

Of particular value in increasing the rate of flow of the molding compound is the presence of bark cork in the formulation. The cork has thermoplastic properties and is useful as a flow promoter and for retarding cure. Up to 10% of the bark fiber, for example, may be replaced with the cork to retard the cure and improve flow without greatly affecting the other properties of the composition. Strength is decreased slightly, but smoothness and gloss of the molded pieces are often improved. Cork may be used only in conjunction with thermosetting resins made with a high aldehyde to phenol ratio.

Those thermoplastics which belong to the group of polymerized coumarone-indene resins are particularly useful for promoting the flow of the molding compound during the molding operation. Terpene derivatives are effective flow promoters, though some of these resins impart to the molding compound a tendency to stick when formulated with liquid one-step resins.

As little as 1% to 4% of coumarone-indene resin incorporated into the initial mix before rolling results in substantially increased permissible rolling times and in a finished compound having markedly increased flow and extrusion properties. For example, a molding compound which is capable of being molded into a simple bar or sheet may be incapable of being molded into a complex object by deep drawing or by extrusion due to the fact that the time period between the melting of the resin and the setting up of the resin is too short for material of the resulting viscosity to be forced into all of the portions of the mold. The incorporation of 1% to 5% of thermoplastic material of the types disclosed in this application will permit, under the same conditions, the manufacture of both the simple pieces and the complex object without loss of either strength or appearance.

It has been found that 1% of compatible coumarone-indene resin increases the flow of a low resin bark filled molding compound by an amount equivalent to that produced by the increase of thermosetting resin content of 4%. For example, the flow properties of a molding compound containing 26% thermosetting resin, plus 1% of a coumarone-indene resin, is equal to the flow properties, other factors remaining constant, of a compound containing 30% thermosetting resin. An advantage attending the use of the recommended thermoplastics as an ingredient of the molding compound is that materials do not deleteriously affect the properties of the molded piece. This fact, coupled with the fact that the thermoplastic flow modifier may be selected from a group of compounds which are much less expensive than are the thermosetting resins, makes the practice of the present invention economically important.

The practice of the invention becomes more and more important in the formulation of molding compounds containing less than 35% thermosetting resin, and particularly those containing less than 30% thermosetting resin, in order to achieve satisfactory flow and cure properties without deleterious effects on the thermoset properties of the molded piece. It is well known that lignin and tricresyl phosphate, when incorporated in thermosetting molding compounds, materially reduce the thermosetting properties and permit excessive cold flow in the molded piece. Applicant has discovered that when a highly reactive filler such as bark is compounded with a resin having a high aldehyde to phenol ratio, certain flow modifiers may be used to produce the desired properties in the molded piece presumably because the reactive matrix absorbs the thermoplastic ingredient so that the compound remains thermosetting.

The practice of the present invention is not to be confused with the practice which is old in the art of incorporating waxes into the formulation for the purpose of improving appearance and surface characteristics of the molding compound, or with the practice of adding waxes or soaps as plasticizers in mold lubricants. It is to be stressed that the purpose of incorporating flow modifiers of the nature described herein is to reduce the viscosity of the molding compound under molding conditions and to make possible the filling of complex molds or the extrusion of the compound into complex molds before the compound becomes thermoset and without the necessity of resorting to the costly procedure of using a high percentage of high priced thermosetting resin in a product which, with low percentages of resin, has the property of producing strong and attractive simple molded objects.

As mentioned above, the flow properties of bark filled low resin molding compounds may also be controlled by the incorporation of predetermined quantities of non-fibrous bark components such as cork and/or parenchyma tissue. Due to the high aldehyde reactivity of these components, satisfaction must be given to the requirement that the resin contains sufficient aldehyde to render the entire mass thermosetting in accordance with the teaching of my copending application Serial Number 316,807, filed October 24, 1952. In this respect, it is important to note that cork from which organic extractives have been removed does not function as a flow modifier and does not require increased aldehyde content of the resin. In other words, solvent extracted cork behaves as a completely inert filler.

One of the most important features related to the use of coumarone-indene resins is the fact that these substances when mixed with the thermosetting molding compound are so completely taken into the structure of the material that after molding the thermoplastic properties often exhibited by cold flow of the molded article are no greater than for thermosetting materials alone. For example, bottle caps containing 2% to 3% Velsicol or Nuba resins can be screwed tightly onto the bottle and will remain so. This is a marked distinction from the performance of bottle caps molded from molding compounds containing waxes or other thermoplastic materials which have been added for purposes of controlling flow and lubricating the compound. Such bottle caps will not remain tight but work loose after a few hours time, due to the cold flow of the molded article.

Cure is the reaction process whereby the molding compound becomes infusible and sets by means of complete polymerization and cross linking of the resin. The time required for this reaction is called the cure time. Cure time varies with (a) the molding temperature, (b) the size, thickness and shape of the molded piece, and (c) the molding compound formulation, particularly the type of resin, resin usage, type of catalyst and alkalinity.

Molding compounds were prepared using cork, fiber and parenchyma tissue, respectively, as the filler, with a basic formulation for each filler using solid two-step phenol-formaldehyde resin, as follows:

| Percent Resin | Percent Filler | Percent Lime | Percent Calcium Stearate |
|---|---|---|---|
| 35 | 61.5 | 3 | 0.5 |
| 28 | 68.5 | 3 | 0.5 |
| 22 | 74.5 | 3 | 0.5 |
| 15 | 81.5 | 3 | 0.5 |

It was found that molding compounds made of fiber cured, whereas those made of cork or parenchyma tissue did not cure, regardless of the resin usage employed. The compounds comprising cork or parenchyma tissue could be made to cure only by substituting bark fiber or wood flour for a large part of the cork or parenchyma tissue employed. However, by careful blending of the several bark fractions, flow and cure properties of the molding compound, and strength and appearance of the molded piece, may be achieved as desired.

To assure satisfactory cure and quality of the product, it is necessary to maintain the compound at a high degree of alkalinity. The bark products are by nature slightly acidic. Aqueous suspensions have a pH of approximately 3.5. The high percentage of bark constituent in the formulation makes it necessary to include a base sufficient to neutralize excess bark acidity, to reduce or eliminate stain, and to maintain a satisfactory rate of cure, which is retarded if the catalyst is partly neutralized by the bark. The preferred catalysts are found in the group of alkaline-earth metals, although for special purposes other alkalies may be employed.

The kind and amount of catalyst in the formulation influences the rate of setting of the molding compound, although to a lesser degree than the catalyst contained in the resin itself. Generally speaking, increasing the amount of a particular catalyst has only a minor influence on the cure, even in amounts up to 10%. There are occasional molding compounds in which an increase of the catalyst usage 1% or 2% reduces the cure time by as much as 50%. Usually, however, increasing the catalyst will reduce the cure time from 0 to from 12% to about 25%. The following alkaline compounds are preferred in the order of reference: magnesium oxide, calcium oxide, calcium hydroxide, sodium tetraborate, zinc oxide and lead oxide.

Table III shows six molding compound formulations embodying like quantities of ingredients, save for the fact that the flow promoter is omitted from one formulation for comparison. The five formulations embodying a flow promoter each include a coumarone-indene resin, the trade designations for each appearing at the head of the respective columns.

Table IV shows six formulations for molding compounds employing like quantities of ingredients save for the fact that the amount of flow promoter varies from 0% to 5.0%, the variation in percentages of flow promoter being reflected by appropriate variations of percentages of bark fiber.

Table V shows two formulations of molding compounds, one including a flow promoter, and one omitting a flow promoter. Note that even after 91 seconds the molding compound from which the flow promoter was omitted did not completely fill the mold.

In the preparation of a molding composition embodying the instant invention, to the bark fiber are added a small amount of zinc stearate, hydrated lime or other catalyst, flow promoter and dye, these ingredients being combined by thorough blending for a period of approximately ten to thirty minutes before adding the resin. If liquid resin is used the amount is calculated on the basis of its solids content; blending or premixing being accomplished in a blade or muller type of mixer before compounding on mixing rolls. Dry, powdered resins may be used in place of liquid resins with equally good results, mixing of the ingredients being accomplished as in a dry powder ribbon mixer. In special molding operations a resin-bark fiber

TABLE III

*Transfer molding compounds with different flow modifiers*

| Formulations: |  | AF-3 | AB-11-2 | AB-11-4 | AD-6-7 | AD-10 |
|---|---|---|---|---|---|---|
| Velsicol | | | | | | |
| Percent Velsicol | 0 | 3.0 | 3.0 | 3.0 | 3.0 | 3.0 |
| Percent Liquid Phenol-Formaldehyde Resin in which the ratio of Formaldehyde to Phenol is about 1.6:1 | 28.0 | 28.0 | 28.0 | 28.0 | 28.0 | 28.0 |
| Percent Pure Fiber | 66.5 | 63.5 | 63.5 | 63.5 | 63.5 | 63.5 |
| Percent MgO | 4.0 | 4.0 | 4.0 | 4.0 | 4.0 | 4.0 |
| Percent Dye | 1.0 | 1.0 | 1.0 | 1.0 | 1.0 | 1.0 |
| Percent Calcium Stearate | 0.5 | 0.5 | 0.5 | 0.5 | 0.5 | 0.5 |
| Tests on Compound: | | | | | | |
| Flow (seconds)— | | | | | | |
| Cup closing (2,000 p. s. i.) | 19 | 16 | 16 | 13 | 16 | 15 |
| Orifice (1,000 p. s. i.) | 53 | 35 | 40 | 34 | 37 | 37 |
| Cure (minutes) | 1.25 | 1.25 | 1.25 | 1.25 | 1.25 | 1.25 |
| Stain (375° F.) | 2 | 3 | 3 | 3 | 3 | 3 |
| Tests on Article: | | | | | | |
| Rupture Modulus (p. s. i.) | 11,500 | 10,000 | 10,500 | 10,900 | 10,800 | 10,200 |
| Tensile (p. s. i.) | 8,100 | 6,300 | 6,900 | 7,000 | 7,200 | 6,700 |
| Impact notched Izod (ft. lb./in.) | 0.39 | 0.38 | 0.40 | 0.37 | 0.38 | 0.37 |
| Processing Conditions: | | | | | | |
| Roll Time (seconds) | 30 | 30 | 30 | 30 | 30 | 30 |
| Roll Temperature (° F.) | 200 | 200 | 200 | 200 | 200 | 200 |

TABLE IV

*The effect of thermoplastic on the flow of a molding compound*

| Formulation: | | | | | | |
|---|---|---|---|---|---|---|
| Percent liquid phenol-formaldehyde resin; 1.4 parts formaldehyde to 1.0 part phenol | 25.0 | 25.0 | 25.0 | 25.0 | 25.0 | 25.0 |
| Percent Fiber | 69.5 | 68.5 | 67.5 | 66.5 | 65.5 | 64.5 |
| Percent MgO | 4.0 | 4.0 | 4.0 | 4.0 | 4.0 | 4.0 |
| Percent Dye | 1.0 | 1.0 | 1.0 | 1.0 | 1.0 | 1.0 |
| Percent Calcium Stearate | 0.5 | 0.5 | 0.5 | 0.5 | 0.5 | 0.5 |
| Percent Velsicol AF-3 | 0 | 1.0 | 2.0 | 3.0 | 4.0 | 5.0 |
| Tests on Compound: | | | | | | |
| Flow (sec.)— | | | | | | |
| Cup Closing Time: | | | | | | |
| 500 p. s. i. | 44 | 36 | 30 | 32 | 27 | 28 |
| 750 p. s. i. | 21 | 21 | 21 | 18 | 17 | 18 |
| 1,000 p. s. i. | 16 | 15 | 14 | 14 | 13 | 13 |
| 2,000 p. s. i. | 8 | 8 | 8 | 7 | 7 | 8 |
| Cure (minutes) | <3 | <3 | <3 | <3 | <3 | <3 |
| Stain (375° F.) | 3 | 3 | 3 | 3 | 3 | 3 |
| Tests on Plastic Article: | | | | | | |
| Rupture Modulus (p. s. i.) | 8,900 | 9,100 | 8,900 | 8,400 | 7,500 | 7,600 |
| Impact (ft. lb./in.) | 0.24 | 0.25 | 0.24 | 0.23 | 0.23 | 0.22 |
| Roll Time (Sec.) | 30 | 30 | 30 | 30 | 30 | 30 |
| Roll Temp. (° F.) | 95 | 95 | 95 | 95 | 95 | 95 |

TABLE V

*Flow properties of molding compounds prepared with and without a flow modifier*

| Formulation: | | |
|---|---|---|
| Percent Phenol-Furfural Resin | 30 | 30 |
| Percent Pure Fiber, micropulverized | 62.5 | |
| Percent Fiber | | 67.5 |
| Percent Lime | 1.0 | 1.0 |
| Percent Dye | 1.0 | 1.0 |
| Percent Zinc Stearate | 0.5 | 0.5 |
| Percent Velsicol AB-11-4 | 5.0 | 0.0 |
| Tests on Compound: | | |
| Flow (Sec.)— | | |
| 500 p. s. i. | 55 | ¹91 |
| 2,000 p. s. i. | 16 | 27 |
| Cure (Min.) | 2.5 | 3.5 |
| Stain (375° F.) | 2 | 3.5 |
| Tests on Plastic: | | |
| Rupture Modulus (p. s. i.) | 9,300 | 8,800 |
| Impact (ft. lb./in.) | 0.27 | 0.28 |
| Roll Time (Sec.) | 60 | 60 |
| Roll Temp. (° F.)— | | |
| Front | 200 | 200 |
| Back | 250 | 250 |

¹ Not quite filled.

blend made in a blade or muller type mixer may be used without further compounding. Molding compositions have been made with 15–35% resin content and 65–85% Douglas fir bark fiber. The mixture is run on the mixing rolls, or passed through the rolls, for a period of from 20 to 120 seconds, depending upon the temperature of the rolls, the physical properties of the mixture and the flow and cure properties desired in the finished compound. The temperature of the rolls is, preferably, equal to the temperature at which the resin starts to flow, good mixing being accomplished by adhering resin to each particle of the bark fiber and other ingredient of the composition to produce a true homogeneous mass.

A function of the mixing rolls is to so advance the resin that the curing of the finished compound will be greatly accelerated in the final molding step. Rolling densifies the bark fiber and heats the resin, causing it to flow and mix with the bark fiber and other ingredients to form a homogeneous sheet. It is important that the temperature of the rolls or mixer be such that the compound advances at a controllable rate so that it will not set during the mixing to an unmoldable compound. It is desirable to advance the resin during the period of compounding on the mixing rolls so as to shorten the time for cure in the mold, but to avoid advancing the resin to the point where the flow is retarded. Thus it will be seen that the period of compounding of the composition is related directly to the flowability of the molding composition and the period of cure of the final product. This type of compounding may be accomplished either by the use of mixing rolls or by the use of heavy friction types of mixers such as Banbury mixers, or by extrusion mixers. For commercial use the mixing rolls are most widely used.

Rolling accomplishes a reduction of the bulk of the fiber and, inversely, increases its density. The bark fiber molding compound is handled easily on the rolls, in that it forms a good sheet, strips clean, and follows the cooler, slower roll. On the other hand, molding compositions of the prior art and having the same or comparable resin content do not form a good sheet, have a tendency to follow both rolls, and strip with difficulty, or merely flake together and fall off the roller. Moreover, combinations of resins and ground bark fiber are easily compounded to homogeneity.

When compounded on the rolls the product of the instant invention is in the form of a soft and flexible sheet which may or may not be cooled, and is ground and screened to give the material an apparent density of approximately 1.17 g./cc. Thereupon, the material is screened to separate the fines and the coarse, the commercial molding powder being that which is retained between 12 and 80 mesh screens. It is not intended, however, to limit the application of the invention to a powder which is retained between 12 and 80 mesh screens, but to include within the scope of the invention a screening which gives a powder of the correct apparent density and having the proper dry flow characteristics which enable it to be satisfactorily preformed for the molding step. If preforming is desired, the bark fiber molding composition produces preforms of such density and cohesiveness that the pills do not shatter on being ejected from the preform machine. This application is a continuation-in-part of application Serial No. 239,407, filed July 30, 1951, by Clark C. Heritage, for Thermosetting Molding Compounds, now abandoned, said application being a continuation-in-part of application Serial No. 534,981, filed May 10, 1944, by Clark C. Heritage, for Molding Compounds, now abandoned.

Having now described my invention and in what manner the same may be used what I claim as new and desire to protect by Letters Patent is:

1. A thermosetting molding composition consisting essentially of the thermal reaction product of a thermosetting moldable phenol-formaldehyde resin and a finely comminuted tissue component derived from the bark of trees and consisting essentially of the bast fiber, said resin having a ratio of formaldehyde to phenol greater than 1.4:1 so as to provide methylol groups both to react with the reactive bodies of the bark components and to provide cross linkages for the resin, and as a flow modifier the cork from the bark of coniferous trees.

2. A thermosetting molding composition having the formulation described in claim 1 wherein the resin solids content of the thermosetting resin comprise from 15% to 40% of the molding composition.

References Cited in the file of this patent

UNITED STATES PATENTS

| Number | Name | Date |
|---|---|---|
| 2,326,569 | Rosenthal | Aug. 10, 1943 |

OTHER REFERENCES

Porter: Chemical Engineering, July 1947, pages 159, 160 and 162.

Marple: Plastics (Chicago), August 1947, pages 44, 65, 66 and 67.

Robitschek: Phenolic Resins, pages 76, 77, 79, 81, Iliffe and Sons, London, England. Copy received in Patent Office March 12, 1950.